Nov. 13, 1956  R. F. SMITH  2,770,333
BRAKE SHOE ADJUSTER AND RELEASE MECHANISM
Original Filed May 9, 1952
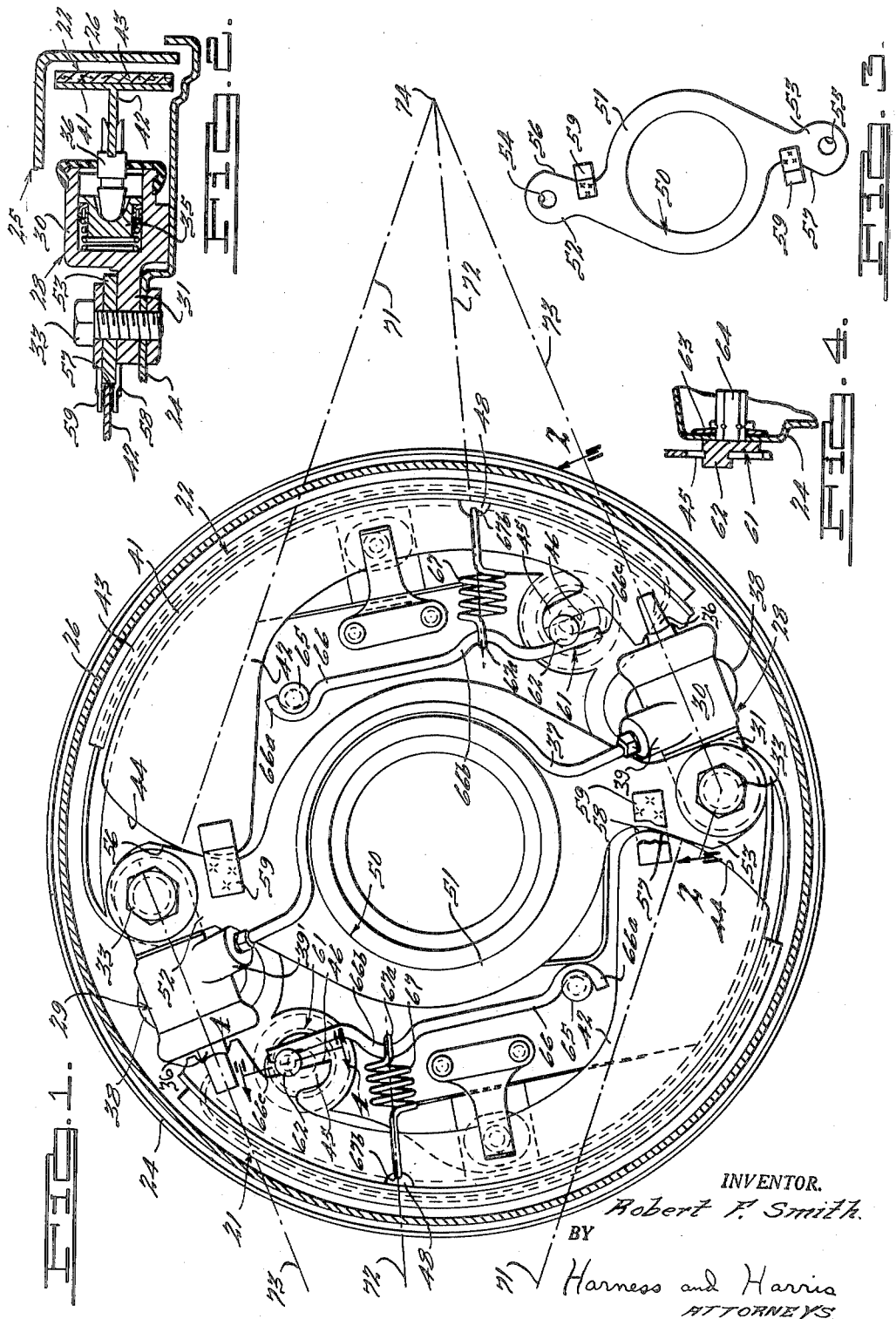
INVENTOR.
Robert F. Smith.
BY
Harness and Harris
ATTORNEYS

United States Patent Office 2,770,333
Patented Nov. 13, 1956

2,770,333

BRAKE SHOE ADJUSTER AND RELEASE MECHANISM

Robert F. Smith, Detroit, Mich., assignor to Chrysler Corporation, Highland Park, Mich., a corporation of Delaware Original application May 9, 1952, Serial No. 286,934. Divided and this application April 22, 1954, Serial No. 424,993

8 Claims. (Cl. 188—216)

This invention relates to internally expanding brake shoe assemblies and particularly to the means for adjusting and retracting the brake shoes of such a brake assembly.

It is a primary object of this invention to provide a brake shoe return spring operatively connected to the brake shoe drum clearance adjusting means and automatically adjustable therewith.

It is still another object of this invention to provide a novel type of brake shoe return spring mechanism that is simple in design, easy to assemble and install, and associated with the shoe clearance adjusting means in a novel manner.

It is still a further object of this invention to provide a single resilient shoe-positioning means for each brake shoe of a brake assembly that is arranged to extend between the brake shoe and the clearance adjusting mechanism associated therewith such that the line of action of the resilient shoe positioning means substantially crosses the intersection point of the lines of action and reaction applied to the toe and heel ends of the shoe respectively.

It is another object of this invention to provide a brake assembly having a novel and improved type of shoe return spring. Other objects and advantages of this invention will become readily apparent from a reading of the following description and a consideration of the accompanying drawings wherein:

Figure 1 is a side elevational view, partly in section, of a two leading shoe brake assembly embodying this invention;

Figure 2 is a fragmentary sectional elevational view of portions of the brake assembly shown in Figure 1, this view being taken along the line 2—2 of Figure 1;

Figure 3 is a side elevational view to a reduced scale of the shoe anchor plate utilized in the embodiment of this invention shown in Figure 1; and Figure 4 is an enlarged, fragmentary, sectional elevational view taken along the line 4—4 of Figure 1 disclosing the brake shoe drum clearance adjusting means.

This application is a division of my co-pending application Serial No. 286,934, filed May 9, 1952, for a Wheel Brake.

Considering Figure 1, the brake assembly shown is composed of a pair of "floating," leading shoes 21 and 22 respectively. Shoes 21 and 22 are movably mounted on a backing or support plate 24 and are adapted to be moved into and out of engagement with the axially extending, surrounding flange 26 of the rotatable brake drum 25. Fixedly mounted on the backing plate 24, in diametrically opposed positions, are a pair of hydraulically operated brake shoe actuating wheel cylinders 28 and 29 respectively. Each wheel cylinder is identical to the other, so a description of one is thought to be sufficient.

From Figures 1 and 2 it will be noted that the wheel cylinder 28 comprises a cylindrical, cup-shaped body portion 30 having a flattened mounting flange 31 extending from the outer side of the closed bottom end of the cylinder cup 30. The mounting flange 31 extends substantially axially with respect to the cylinder bore of wheel cylinder 28, and this mounting flange 31 is connected to the inner or front face of the backing plate 24 by the anchor bolt 33. Within the bore in the body portion 30 of the wheel cylinder 28 is an axially reciprocable piston 35. Piston 35 is connected by a plunger rod 36 to the web portion 42 at the toe end of brake shoe 22. Wheel cylinder body portion 30 has a port or inlet (not shown) that is adapted to be connected to a pressure fluid supply line (not shown) to provide for introduction of pressurized fluid to the cylinder bore in the wheel cylinder 28. The backing plate 24 is pierced by an opening 38 to permit connection of the aforementioned pressure fluid supply line (not shown) to the cylinder bore. Wheel cylinder body portion 30 has a bored and threaded boss 39 projecting from its front side, which boss 39 is adapted to be connected by a conduit line 37 to a similar boss 39' on the front side of the wheel cylinder 29, to provide for introduction of pressurized fluid to the bore of wheel cylinder 29.

Each of the brake shoes 21 and 22 is identical in construction, so a description of the shoe 22 is thought to suffice. Shoe 22 is of T-shaped cross sectional configuration (see Figure 2) and is composed of an arcuate table or rim portion 41 and a connected web portion 42 that extends perpendicularly to the inner side of the rim portion 41 along the longitudinal centerline thereof. The outer side of shoe rim portion 41 is covered with a layer of brake lining 43 of conventional construction. The toe end of the web 42 is connected to the associated wheel cylinder 28 through the plunger rod 36 as previously described. The heel end of the shoe web 42 has the end edge 44 thereof shaped to provide a convexly curved portion that is adapted to both roll and/or slide along a substantially radially extending ramp surface 56 of the associated anchor plate 50.

Anchor plate 50 (see Figure 3) has a flat ring-like body portion 51 with diametrically opposed ears 52 and 53 projecting therefrom. Each ear 52 and 53 is pierced by a bolt-receiving opening 54 and 55 respectively, which openings receive the wheel cylinder anchor bolts 33. Each of the ears 52 and 53 has a side edge surface thereof formed with a substantially radially directed ramp surface 56 and 57 respectively. Each of the ears 52, 53 has a pair of brake shoe guide plates 58 and 59 respectively, mounted on the opposite sides thereof adjacent the ramp surfaces 56, 57 respectively. Guide plates 58 and 59 may be welded to opposite sides of the ears 52, 53 and they project beyond the sides of the ears 52, 53 so as to provide slots (see Figure 2) that receive the web portions 42 of the brake shoes. The guide plates 58, 59 thus provide a means for centering and guiding the brake shoes 21, 22 relative to the width of the brake drum flange 26 and they also resist cocking or tipping of the shoes relative to the brake drum flange 26.

Each of the brake shoes 21, 22 has a radially extending finger 45 projecting from its web portion 42 adjacent the toe end of the shoe. Each web finger 45 is adapted to cooperate with a rotatable cam element 61 (see Figure 4) that is carried by the brake support plate 24 so as to provide a mechanism to set and adjust the clearance between the brake shoe linings 43 and the encircling drum flange 26. Cam element 61 has an eccentrically mounted post portion 62 that is adapted to be engaged with and to slide along the edge surface 46 of the brake shoe web finger 45 during rotation of the cam element 61. It is thought to be obvious that rotation of the cam element 61 will cause the post portion 62 thereof to act upon the web finger side edge 46 such that the associated brake shoe will be moved relative to the encircling brake drum. Cam element 61 has a spring washer 63 encircling the shaft 64 of the cam element and engaged with the outer side of brake support plate 24 so as to retain the cam element in its adjusted position. Shaft 64 of the cam element 61 is formed with flat faces that are readily engaged by a wrench or the like to facilitate rotation of the cam element.

The rotatable cam elements 61 not only provide means to adjust the drum clearance between the brake shoes and the encircling drum flange 26, but in addition, these cam elements 61 provide a portion of the brake shoe return spring anchor means. The brake shoe return spring mechanism shown is an improvement over that shown in the patent application of Robert F. Smith, Serial No. 111,461, filed August 20, 1949, now U. S. Patent No. 2,621,761. It is an object of this invention, as previously pointed out, to provide a brake shoe return spring mechanism that is easy to assemble, economical, durable, and one that will give the maximum free space within the brake assembly. The brake shoe return spring mechanism disclosed accomplishes each of these noted objects. The shoe return spring mechanisms associated with the brake shoes 21, 22 each comprise an anchor stud 65 that is carried by the brake support or backing plate 24. Extending between the stud 65 and the eccentrically mounted cam post 62 is a wire strut member 66. Strut member 66 has its end 66a curved to seat about the associated anchor stud 65. Intermediate the ends of strut 66 a curved seat 66b is formed to provide an anchor for one end 67a of a resilient tension spring element 67. The other end 67b of the spring element 67 is anchored in an aperture 48 formed in the web 42 of the associated brake shoe. The end portion 66c of the strut 66 is substantially straight and is adapted to press against and to permit the cam post 62 to slide therealong during adjustment of the brake shoe drum clearance.

It will be noted that the shoe return springs 67 exert a force along a line 72 that tends to pull the heel edge 44 of the associated brake shoe against its anchor ramp surface 57 and to also retract the toe end of the associated shoe toward its actuating wheel cylinder. Thus the shoe return spring 67 not only retracts the shoe, but also tends to maintain the shoe heel end 44 in its adjusted position on the anchor ramp 57. Lines 71 and 73 represent the action lines of the brake shoe reaction and the brake shoe actuating forces applied to each shoe while point 74 is their point of intersection. This brake geometry is disclosed in A. R. Trahern application Serial No. 256,706, filed November 16, 1951, now U. S. Patent 2,740,498.

In addition to being formed of inexpensive, simple parts, this shoe return spring mechanism is designed so that the minimum size springs may be used and these small springs kept within their elastic limits regardless of the amount of brake shoe lining wear and consequent brake shoe adjustment. By anchoring the end 66c of the strut 66 against the eccentrically mounted shoe adjusting cam post 62, it will be seen that as the shoe is adjusted and moved outwardly to compensate for lining wear, that the strut 66 also moves outwardly and consequently no increased stresses are set up in the return spring 67. This theory is more thoroughly explained in patent application Serial No. 111,461, now U. S. Patent No. 2,621,761, that was previously mentioned. As the spring stresses set up in return springs 67 are more or less fixed and relatively low, a small size, inexpensive return spring may be utilized. Furthermore, as the springs 67 do not extend between the opposed brake shoes 21, 22, there is provided the maximum free space within the brake assembly. Due to the low strength springs 67 and their arrangement in the brake assembly, it is possible to assemble the return springs 67 in the brake assembly without the use of any special spring stretching tools or the like and thus time and cost of brake assembly is materially reduced.

As the brake shoes 21 and 22 are identical and as there are two sets of identical shoe-operating elements associated with these two shoes 21, 22, there has been a complete description of the elements associated with only the shoe 22. The similar elements associated with shoe 21 carry reference numerals corresponding to the identical elements described with regard to brake shoe 22.

I claim:

1. In a brake assembly, a support plate, a brake shoe of the expanding type rockably mounted on said support plate, a rotatable cam carried by said support plate having portions engageable with said shoe to provide for adjustment of the shoe relative to said support, an anchor means carried by said support plate and spaced from said cam, a strut member extending between said cam and said anchor means, and a resilient element connected between said strut and said shoe.

2. In a brake assembly, a support, an arcuately shaped brake shoe comprising connected rim and web sections, means mounting said shoe on said support for pivotal movement relative thereto, a cam element rotatably mounted on said support having portions thereof engageable with the web section of said shoe to provide for adjustable positioning of said shoe relative to said support, an anchor member mounted on said support and spaced circumferentially of said brake shoe from said cam element at a position between the ends of said shoe, a strut member extending between said cam element and said anchor member and arranged to provide for relative movement between the strut and said cam element, and a resilient element tensioned between said strut and said brake shoe.

3. In a brake assembly, a support, a brake shoe mounted on said support for movement relative thereto, a brake drum arranged to be selectively engaged by said shoe, a cam means arranged on said support to actuate said shoe towards and away from said brake drum, an anchor means carried by said support and spaced from said cam means, a strut member extending between said cam means and said anchor means, and a resilient element connected between said shoe and said strut.

4. In a brake assembly, a support member, a brake member movably mounted on said support member, an adjusting member movably mounted on said support member and arranged to have portions thereof engaged with the brake member to provide for adjustment of the brake member position on said support, an anchor member spaced from said adjusting member, a strut extending between the movably mounted adjusting member and the anchor member, and resilient means connected between the strut and the brake member.

5. In a brake assembly, a support member, a brake member movably mounted on said support member, an adjusting member movably mounted on said support member and arranged to have portions thereof engaged with the brake member to provide for adjustment of the brake member position on said support, an anchor member fixedly mounted on said support member, and a resilient means having certain portions thereof connected between the movable adjusting means and the anchor members and other portions connected to the brake member.

6. In a brake assembly, a support plate, a brake shoe of the expanding type rockably mounted on said support plate, a rotatable cam carried by said support plate having portions engageable with said shoe to provide for adjustment of the shoe relative to said support, an anchor means carried by said support plate and spaced from said cam, a member that includes a resilient portion extending between said cam and said anchor means, said member having portions thereof connected to said shoe.

7. In a brake assembly, a support, an arcuately shaped brake shoe comprising connected rim and web sections, means mounting said shoe on said support for pivotal movement relative thereto, a cam element rotatably mounted on said support having portions thereof engageable with the web section of said shoe to provide for adjustable positioning of said shoe relative to said support, an anchor member mounted on said support and spaced circumferentially of said brake shoe from said cam element at a position between the ends of said shoe, a strut member that includes a resilient portion extending between said cam element and said anchor member and arranged to provide for relative movement between the strut and said cam element, said last mentioned strut having portions thereof connected to said brake shoe.

8. In a brake assembly, a support, a brake shoe mounted on said support for movement relative thereto, a brake drum arranged to be selectively engaged by said shoe, a cam means arranged on said support to actuate said shoe towards and away from said brake drum, an anchor means carried by said support and spaced from said cam means, a strut member extending between said cam means and said anchor means, including a resilient portion connected between said shoe and said strut.

References Cited in the file of this patent

UNITED STATES PATENTS 2,621,761     Smith _____ Dec. 16, 1952